United States Patent
Yamashiro et al.

(10) Patent No.: US 10,526,472 B2
(45) Date of Patent: Jan. 7, 2020

(54) PNEUMATIC TIRE AND METHOD FOR PRODUCING PNEUMATIC TIRE

(71) Applicant: SUMITOMO RUBBER INDUSTRIES, LTD., Kobe-shi, Hyogo (JP)

(72) Inventors: Yuhei Yamashiro, Kobe (JP); Takeo Nakazono, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/410,998

(22) Filed: Jan. 20, 2017

(65) Prior Publication Data

US 2017/0240724 A1  Aug. 24, 2017

(30) Foreign Application Priority Data

Feb. 18, 2016 (JP) ................. 2016-029075

(51) Int. Cl.
| C08K 5/5398 | (2006.01) |
| C08C 19/02 | (2006.01) |
| C08K 3/04 | (2006.01) |
| C08K 3/36 | (2006.01) |

(52) U.S. Cl.
CPC ............ *C08K 5/5398* (2013.01); *C08C 19/02* (2013.01); *C08K 3/04* (2013.01); *C08K 3/36* (2013.01)

(58) Field of Classification Search
CPC .......... C08K 3/36; C08K 3/04; C08K 5/5398; C08K 5/47; C08K 5/31; C08K 5/548; C08K 5/40; C08C 19/02; B60C 1/00
See application file for complete search history.

(56) References Cited

U.S. PATENT DOCUMENTS

| 4,124,051 A | 11/1978 | Horton |
| 4,945,964 A | 8/1990 | Takiguchi et al. |
| 5,191,003 A | 3/1993 | Inui et al. |
| 5,385,459 A | 1/1995 | Graves et al. |
| 5,627,237 A | 5/1997 | Halasa et al. |
| 5,711,904 A | 1/1998 | Eswaran et al. |
| 5,804,644 A | 9/1998 | Nakafutami et al. |
| 6,058,994 A | 5/2000 | Amino et al. |
| 9,127,145 B2 | 9/2015 | Tanabe |
| 10,189,974 B2 | 1/2019 | Takenaka et al. |
| 2001/0016629 A1 | 8/2001 | Mori et al. |
| 2004/0242797 A1 | 12/2004 | Stere et al. |
| 2004/0254301 A1 | 12/2004 | Tsukimawashi et al. |
| 2005/0119414 A1 | 6/2005 | Sasagawa et al. |
| 2005/0119452 A1 | 6/2005 | Yamaguchi et al. |
| 2005/0234193 A1 | 10/2005 | Sasagawa et al. |
| 2005/0277750 A1 | 12/2005 | Masaki et al. |
| 2006/0167160 A1 | 7/2006 | Nakagawa et al. |
| 2007/0078202 A1 | 4/2007 | Mihara et al. |
| 2007/0276090 A1 | 11/2007 | Aoki et al. |
| 2011/0136962 A1 | 6/2011 | Hattori et al. |
| 2011/0144236 A1 | 6/2011 | Mihara |
| 2011/0166254 A1 | 7/2011 | Nishimura |
| 2011/0184084 A1 | 7/2011 | Katou |
| 2012/0016056 A1 | 1/2012 | Miyazaki |
| 2012/0148917 A1 | 6/2012 | Kobayashi et al. |
| 2012/0283354 A1 | 11/2012 | Hattori et al. |
| 2012/0325391 A1 | 12/2012 | Miyazaki |
| 2013/0079464 A1 | 3/2013 | Nishioka et al. |
| 2014/0090764 A1 | 4/2014 | Miyazaki |
| 2014/0329930 A1 | 11/2014 | Sato |
| 2014/0371372 A1 | 12/2014 | Hirayama |
| 2015/0031839 A1 | 1/2015 | Washizu |
| 2015/0361210 A1 | 12/2015 | Nosaka et al. |
| 2015/0368387 A1 | 12/2015 | Nosaka et al. |

(Continued)

FOREIGN PATENT DOCUMENTS

| CN | 1156467 A | 8/1997 |
| CN | 1541245 A | 10/2004 |

(Continued)

OTHER PUBLICATIONS

"Rubber composition for pneumatic tire, is formed by mixing specific hydrogenated styrene-butadiene copolymer and aromatic vinyl compound conjugated diene compound copolymer, each having preset weight average molecular weight," Database WPI Week 200661, Thomson Scientific, London, GB, An 2006-589923, Aug. 17, 2006, 2 pages, XP002770767.
Sanshin Chemical Industry, "Sanceler TBZTD," retrieved from URL:http:www.sanshin-ci.co.jp/eng/index/syouhin/1/sanceler_tbztd. htm, retrieved Dec. 17, 2018, 1 page.
Author Unknown, "Carbon Black Production and Application Manual," Sep. 30, 2000, 8 pages total.
English translation of Chinese Office Action for Appl. No. 201580044378.4 dated Aug. 16, 2018.
English translation of the Chinese Office Action for Application No. 201580044936.7, dated Mar. 30, 2018.
International Search Report (Form PCT/ISA/210) for International Application No. PCT/JP2015/069823, dated Oct. 13, 2015.

(Continued)

*Primary Examiner* — Peter D. Mulcahy
(74) *Attorney, Agent, or Firm* — Birch, Stewart, Kolasch & Birch LLP

(57) ABSTRACT

Provided is a pneumatic tire having well-improved fuel economy, rubber tensile strength, and abrasion resistance while maintaining adequate productivity. The present invention relates to a pneumatic tire formed from a rubber composition, the rubber composition containing a hydrogenated copolymer and a sulfur donor, the hydrogenated copolymer containing a structural unit derived from an aromatic vinyl compound and a structural unit derived from a conjugated diene compound and having a degree of hydrogenation of the conjugated diene portion of 75 mol % or more, the hydrogenated copolymer being present in an amount of 75% by mass or more based on 100% by mass of a rubber component in the rubber composition, the sulfur donor being present in an amount of 0.2 to 8 parts by mass per 100 parts by mass of the rubber component.

13 Claims, No Drawings

(56) References Cited

U.S. PATENT DOCUMENTS

| | | | |
|---|---|---|---|
| 2016/0339743 A1 | 11/2016 | Abad et al. | |
| 2017/0066910 A1 | 3/2017 | Miura | |
| 2017/0226233 A1* | 8/2017 | Yamashiro | B60C 1/00 |
| 2017/0226331 A1* | 8/2017 | Ishino | C08L 15/00 |
| 2017/0233562 A1 | 8/2017 | Yamada et al. | |
| 2017/0240731 A1* | 8/2017 | Yamashiro | C08L 15/00 |
| 2018/0142089 A1* | 5/2018 | Yamashiro | B60C 1/0016 |

FOREIGN PATENT DOCUMENTS

| | | | |
|---|---|---|---|
| CN | 1576279 A | 2/2005 | |
| CN | 101412515 A | 4/2009 | |
| CN | 101990558 A | 3/2011 | |
| CN | 102093602 A | 6/2011 | |
| CN | 106519351 A | 3/2017 | |
| EP | 775725 A1 * | 5/1997 | |
| EP | 0775725 A1 | 5/1997 | |
| EP | 1258498 A1 | 11/2002 | |
| EP | 2236554 A1 | 10/2010 | |
| EP | 2757131 A1 | 7/2014 | |
| EP | 2960286 A1 | 12/2015 | |
| EP | 2963087 A1 | 1/2016 | |
| EP | 3064545 A1 | 9/2016 | |
| EP | 3162846 A1 | 5/2017 | |
| EP | 3208108 A1 * | 8/2017 | |
| JP | 2-147647 A | 6/1990 | |
| JP | 6-9822 A | 1/1994 | |
| JP | 7-76635 A | 3/1995 | |
| JP | 8-59898 A | 3/1996 | |
| JP | 10-182884 A | 7/1998 | |
| JP | 2000-119445 A | 4/2000 | |
| JP | 2000-344955 A | 12/2000 | |
| JP | 2001-81243 A | 3/2001 | |
| JP | 2002-12704 A | 1/2002 | |
| JP | 2002-212340 A | 7/2002 | |
| JP | 2003-41059 A | 2/2003 | |
| JP | 2003-277560 A | 10/2003 | |
| JP | 2006-213807 * | 8/2006 | |
| JP | 2006-213807 A | 8/2006 | |
| JP | 2006-249188 A | 9/2006 | |
| JP | 2007-137941 A | 6/2007 | |
| JP | 4060105 B2 | 3/2008 | |
| JP | 2008-174696 A | 7/2008 | |
| JP | 2008-184517 A | 8/2008 | |
| JP | 2008-248203 A | 10/2008 | |
| JP | 2010-242019 A | 10/2010 | |
| JP | 2010-265379 A | 11/2010 | |
| JP | 2011-1435 A | 1/2011 | |
| JP | 2011-140613 A | 7/2011 | |
| JP | 2011-144239 A | 7/2011 | |
| JP | 2011-153293 A | 8/2011 | |
| JP | 2011-236368 A | 11/2011 | |
| JP | 2011-252116 A | 12/2011 | |
| JP | 2012-52028 A | 3/2012 | |
| JP | 2012-153810 A | 8/2012 | |
| JP | 2012-188537 A | 10/2012 | |
| JP | 2013-18868 A | 1/2013 | |
| JP | 2013-28783 A | 2/2013 | |
| JP | 2013-35902 A | 2/2013 | |
| JP | 2013-82778 A | 5/2013 | |
| JP | 2013-224391 A | 10/2013 | |
| JP | 2013-249421 A | 12/2013 | |
| JP | 2013-253207 A | 12/2013 | |
| JP | 2014-24913 A | 2/2014 | |
| JP | 2014-80451 A | 5/2014 | |
| JP | 2014-95018 A | 5/2014 | |
| JP | 2014-95081 A | 5/2014 | |
| JP | 2014-105296 A | 6/2014 | |
| JP | 2014-125546 A | 7/2014 | |
| JP | 2014-133827 A | 7/2014 | |
| JP | 2014-133828 A | 7/2014 | |
| JP | 2015-54875 A | 3/2015 | |
| JP | 2015-110703 A | 6/2015 | |
| JP | 2017-52874 A | 3/2017 | |
| WO | WO 2009/060931 A1 | 5/2009 | |
| WO | WO 2013/099324 A1 | 7/2013 | |
| WO | WO 2013/125614 A1 | 8/2013 | |
| WO | WO 2014/126184 A1 | 8/2014 | |
| WO | WO 2014/133097 A1 | 9/2014 | |
| WO | WO 2015/064646 A1 | 5/2015 | |
| WO | WO 2016/039008 A1 | 3/2016 | |

OTHER PUBLICATIONS

International Search Report for PCT/JP2015/069836 (PCT/ISA/210) dated Oct. 13, 2015.

Written Opinion of the International Searching Authority for PCT/JP2015/069836 (PCT/ISA/237) dated Oct. 13, 2015.

Written Opinion of the International Searching Authority (Form PCT/ISA/237) for International Application No. PCT/JP2015/069823, dated Oct. 13, 2015.

Zhao, S.G., et al, "Effect of Coupling Agent on Properties of Silica Z1115MP Filled SSBR/BR Compound," Journal of Qingdao University of Science and Technology (Natural Science Edition), Aug. 31, 2013, vol. 34, No. 4, pp. 387-392.

"Polymer Chemistry and Physics," Light Industry Press, Feb. 28, 1981, p. 351 (2 pages total).

English translation of the Chinese Office Action for Application No. 201580044936.7, dated Nov. 16, 2018.

Yanming et al., "Polymer Structure and Properties," East China University of Science and Technology Press, Jan. 31, 2010, p. 278-279 (3 pages total).

ASTM, "Standard Test Method for Carbon Black-CTAB (Cetyltrimethylammonium Bromide) Surface Area (Withdrawn 2007)," ASTM D3765-04, 2004, XP-002778471, 3 pages.

ASTM, "Standard Test Methods for Carbon Black-Surface Area by Multipoint B.E.T. Nitrogen Adsorption (Withdrawn 2000)," ASTM D4820-99, 1999, XP-002778482, 2 pages.

ASTM, "Standard Test Methods for Carbon Black-Surface Area by Nitrogen Adsorption (Withdrawn 1999)," ASTM D3037-93, 1993, XP-002778481, 2 pages.

Chinese Office Action and Search Report for Chinese Application No. 201580045221.3, dated Mar. 30, 2018, with an English translation of the Office Action.

\* cited by examiner

PNEUMATIC TIRE AND METHOD FOR PRODUCING PNEUMATIC TIRE

TECHNICAL FIELD

The present invention relates to a pneumatic tire formed from a specific rubber composition and a method for producing the pneumatic tire.

BACKGROUND ART

With the recent increase in concern about environmental issues, the demand for fuel efficient automobiles has been increasing. There is also a need for rubber compositions for automotive tires having higher fuel economy. For example, rubber compositions containing conjugated diene polymers such as polybutadiene or butadiene-styrene copolymers and filler such as carbon black or silica are used in automotive tires.

Patent Literature 1, for example, proposes a method for improving fuel economy by using a diene rubber (modified rubber) that has been modified with an organosilicon compound containing an amino group and an alkoxy group. Although such conventional techniques improve fuel economy, it is also important from economic and safety standpoints to ensure sufficient abrasion resistance and tensile properties (rubber tensile strength). In the conventional techniques, unfortunately, the abrasion resistance, which is in a trade-off relationship with fuel economy, is insufficient to solve this challenge, and rubber chipping can also be caused. Thus, it is difficult to simultaneously improve fuel economy, rubber tensile strength, and abrasion resistance.

Patent Literature 2 proposes a method for improving rubber tensile strength, abrasion resistance, and other properties by the use of a hydrogenated diene polymer.

CITATION LIST

Patent Literature

Patent Literature 1: JP 2000-344955 A
Patent Literature 2: JP H2-147647 A

SUMMARY OF INVENTION

Technical Problem

The method of Patent Literature 2 allows for improvement of rubber tensile strength and abrasion resistance while maintaining good fuel economy. However, the present inventors have found, after research, that rubber compositions containing hydrogenated diene polymers (hereinafter, also referred to as hydrogenated copolymers) have the drawback of insufficient cure rate and therefore poor productivity.

The present invention aims to solve the above problem and provide a pneumatic tire having well-improved fuel economy, rubber tensile strength, and abrasion resistance while maintaining adequate productivity.

Solution to Problem

The present invention relates to a pneumatic tire, formed from a rubber composition, the rubber composition containing a hydrogenated copolymer and a sulfur donor, the hydrogenated copolymer containing a structural unit derived from an aromatic vinyl compound and a structural unit derived from a conjugated diene compound and having a degree of hydrogenation of the conjugated diene portion of 75 mol % or more, the hydrogenated copolymer being present in an amount of 75% by mass or more based on 100% by mass of a rubber component in the rubber composition, the sulfur donor being present in an amount of 0.2 to 8 parts by mass per 100 parts by mass of the rubber component.

The hydrogenated copolymer preferably has a weight average molecular weight of 200,000 to 2,000,000.

The hydrogenated copolymer preferably has a degree of hydrogenation of 90 mol % or more.

The hydrogenated copolymer is preferably a hydrogenated styrene-butadiene copolymer.

The hydrogenated styrene-butadiene copolymer is preferably a hydrogenated modified styrene-butadiene copolymer.

The hydrogenated styrene-butadiene copolymer preferably has a styrene content of 5% to 40% by mass.

The hydrogenated styrene-butadiene copolymer is preferably present in an amount of 90% to 100% by mass based on 100% by mass of the rubber component.

Preferably, the rubber composition further contains, per 100 parts by mass of the rubber component, 1 to 200 parts by mass of silica and 1 part by mass or more of carbon black.

The present invention also relates to a method for producing the above-described pneumatic tire, the method including: a base kneading step of kneading the rubber component including the hydrogenated copolymer, and a final kneading step of adding the sulfur donor to the kneadate obtained in the base kneading step and kneading them.

Advantageous Effects of Invention

The pneumatic tire of the present invention is formed from a rubber composition that contains a specific hydrogenated copolymer with a degree of hydrogenation of 75 mol % or more in an amount of 75% by mass or more based on 100% by mass of the rubber component and further contains 0.2 to 8 parts by mass of a sulfur donor per 100 parts by mass of the rubber component. It is thus possible to provide a pneumatic tire having well-improved fuel economy, rubber tensile strength, and abrasion resistance while maintaining adequate productivity.

DESCRIPTION OF EMBODIMENTS

The pneumatic tire of the present invention is formed from a rubber composition. The rubber composition contains, based on 100% by mass of the rubber component, 75% by mass or more of a hydrogenated copolymer obtained by copolymerizing an aromatic vinyl compound and a conjugated diene compound to produce a copolymer containing a structural unit derived from the aromatic vinyl compound and a structural unit derived from the conjugated diene compound (hereinafter, also referred to as a copolymer of an aromatic vinyl compound and a conjugated diene compound) and hydrogenating the conjugated diene portion (the structural unit derived from the conjugated diene compound) of the copolymer to give a degree of hydrogenation of 75 mol % or more. The rubber composition further contains 0.2 to 8 parts by mass of a sulfur donor per 100 parts by mass of the rubber component.

The rubber composition in the present invention contains, based on 100% by mass of the rubber component, 75% by mass or more of a hydrogenated copolymer obtained by hydrogenating the conjugated diene portion of a copolymer of an aromatic vinyl compound and a conjugated diene compound to a degree of hydrogenation of 75 mol % or more. This improves rubber tensile strength and abrasion resistance while maintaining or improving good fuel economy. As mentioned earlier, rubber compositions incorporating hydrogenated copolymers usually tend to show insufficient cure rate and therefore poor productivity. Such tendency is noticeable particularly for hydrogenated copolymers having a degree of hydrogenation of 75 mol % or more. The rubber composition in the present invention which contains a sulfur donor as well can show an improved cure rate, thereby ensuring adequate productivity.

The rubber composition in the present invention is characterized by containing, in the rubber component, a hydrogenated copolymer obtained by hydrogenating the conjugated diene portion of a copolymer of an aromatic vinyl compound and a conjugated diene compound. Conventional rubbers contain a large number of double bonds where a crosslinking reaction can take place, thereby leading to variations in crosslink concentration which are considered to cause stress concentration that can initiate fracture. According to the present invention, the hydrogenation treatment reduces the number of double bonds to reduce the reactive sites for crosslinking. Thus, the variations in crosslink concentration are expected to decrease so that the stress concentration is relaxed, thereby resulting in improvements in abrasion resistance and other properties.

Examples of the aromatic vinyl compound include styrene, α-methylstyrene, 1-vinylnaphthalene, 3-vinyltoluene, ethylvinylbenzene, divinylbenzene, 4-cyclohexylstyrene, and 2,4,6-trimethylstyrene. Each of these compounds may be used alone, or two or more of these may be used in combination. Among these examples, styrene is particularly preferred in view of practical aspects such as monomer availability and because then the effects of the present invention can be more suitably achieved.

Examples of the conjugated diene compound include 1,3-butadiene, isoprene, 1,3-pentadiene, 2,3-dimethylbutadiene, 2-phenyl-1,3-butadiene, and 1,3-hexadiene. Each of these compounds may be used alone, or two or more of these may be used in combination. Among these examples, 1,3-butadiene or isoprene is preferred, with 1,3-butadiene being more preferred, in view of practical aspects such as monomer availability and because then the effects of the present invention can be more suitably achieved.

The copolymer of an aromatic vinyl compound and a conjugated diene compound is preferably a copolymer of styrene and 1,3-butadiene (styrene-butadiene copolymer) because its combined use with a sulfur donor has a significant improvement effect. The hydrogenated copolymer is thus preferably a hydrogenated styrene-butadiene copolymer. Furthermore, the hydrogenated styrene-butadiene copolymer is preferably a hydrogenated modified styrene-butadiene copolymer that has been modified as described later.

The styrene-butadiene copolymer can be produced by copolymerization of styrene and 1,3-butadiene in any order, and may be produced by random copolymerization or block copolymerization, preferably by random copolymerization. The same is true for copolymers of aromatic vinyl compounds and conjugated diene compounds other than styrene-butadiene copolymers.

The degree of hydrogenation of the hydrogenated copolymer (the degree of hydrogenation of the conjugated diene portion of the copolymer of an aromatic vinyl compound and a conjugated diene compound) is 75 mol % or more, preferably 80 mol % or more, more preferably 90 mol % or more, still more preferably 93 mol % or more. If the degree of hydrogenation is less than 75 mol %, rubber tensile strength and abrasion resistance are not readily improved. The degree of hydrogenation of the hydrogenated copolymer is also preferably 99 mol % or less, more preferably 98 mol % or less. If the degree of hydrogenation is more than 99 mol %, the resulting rubber composition may become hard.

The degree of hydrogenation can be calculated from the rate of decrease in the intensity of a $^1$H-NMR spectrum corresponding to unsaturated bonds.

The hydrogenated copolymer preferably has a weight average molecular weight (Mw) of 200,000 or more, more preferably 400,000 or more. With the hydrogenated copolymer having a Mw of less than 200,000, good rubber tensile strength and good abrasion resistance may not be obtained. The Mw of the hydrogenated copolymer is also preferably 2,000,000 or less, more preferably 1,000,000 or less, still more preferably 700,000 or less. With the hydrogenated copolymer having a Mw of more than 2,000,000, processability tends to decrease.

Herein, the weight average molecular weight (Mw) and the number average molecular weight (Mn) can be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

The hydrogenated copolymer preferably has a glass transition temperature (Tg) of −45° C. or higher, more preferably −35° C. or higher, still more preferably −30° C. or higher. With the hydrogenated copolymer having a Tg of lower than −45° C., rubber tensile strength may decrease. The Tg of the hydrogenated copolymer is also preferably lower than −10° C., more preferably lower than −12.5° C., still more preferably lower than −13° C., further preferably lower than −15° C., particularly preferably lower than −17.5° C., most preferably lower than −20° C. With the hydrogenated copolymer having a Tg of −10° C. or higher, the rubber may harden at a low temperature of not higher than 0° C., thereby deteriorating durability such as abrasion resistance or rubber tensile strength.

The glass transition temperature (Tg) of the hydrogenated copolymer is measured as described later in EXAMPLES.

In the case where the hydrogenated copolymer is a hydrogenated styrene-butadiene copolymer, the hydrogenated styrene-butadiene copolymer preferably has a styrene content of 5% by mass or more, more preferably 10% by mass or more, still more preferably 15% by mass or more, particularly preferably 20% by mass or more, most preferably 25% by mass or more. With the hydrogenated styrene-butadiene copolymer having a styrene content of less than 5% by mass, sufficient grip performance may not be obtained. The styrene content of the hydrogenated styrene-butadiene copolymer is also preferably 40% by mass or less, more preferably 35% by mass or less. With the hydrogenated styrene-butadiene copolymer having a styrene content of more than 40% by mass, sufficient rubber tensile strength and sufficient abrasion resistance may not be obtained, and fuel economy may also deteriorate. With the hydrogenated styrene-butadiene copolymer having a styrene content falling within the range indicated above, the effects of the present invention can be more suitably achieved.

The styrene content is measured as described later in EXAMPLES.

The hydrogenated copolymer may be synthesized, for example, by polymerizing an aromatic vinyl compound and a conjugated diene compound to produce a polymer and hydrogenating the polymer, specifically as follows.

<Method for Producing Copolymer>

(Polymerization Method)

The copolymer of an aromatic vinyl compound and a conjugated diene compound may be polymerized by any method, including solution polymerization, vapor phase polymerization, and bulk polymerization, and particularly preferably by solution polymerization. The polymerization may be carried out either in a batch mode or in a continuous mode.

For solution polymerization, the monomer concentration (the combined concentration of styrene and 1,3-butadiene in the case of a styrene-butadiene copolymer) in the solvent is preferably 5% by mass or more, more preferably 10% by mass or more. If the monomer concentration in the solvent is less than 5% by mass, the copolymer yield tends to be small, resulting in increased cost. The monomer concentration in the solvent is also preferably 50% by mass or less, more preferably 30% by mass or less. If the monomer concentration in the solvent is more than 50% by mass, the solution tends to become too viscous to stir easily, and thus polymerization tends not to occur easily.

(Polymerization Initiator in Anionic Polymerization)

For anionic polymerization, any type of polymerization initiator may be used. Preferred are organic lithium compounds which preferably contain a C2-C20 alkyl group, such as ethyllithium, n-propyllithium, isopropyllithium, n-butyllithium, sec-butyllithium, tert-butyllithium, tert-octyllithium, n-decyllithium, phenyllithium, 2-naphthyllithium, 2-butylphenyllithium, 4-phenylbutyllithium, cyclohexyllithium, cyclopentyllithium, and reaction products of diisopropenylbenzene and butyllithium. In view of availability, safety and other aspects, preferred among these is n-butyllithium or sec-butyllithium.

The polymerization reaction may be carried out in the presence of a compound (R) obtained by mixing at least one of the organic lithium compounds mentioned above with a compound (B1) containing a functional group interactive with silica. In the polymerization in the presence of the compound (R), the functional group interactive with silica is introduced to the polymerization initiating terminal of the copolymer. Thus, the resulting copolymer has a modified polymerization initiating terminal. The term "interactive" herein means the formation of a covalent bond or an intermolecular force weaker than covalent bonds (e.g. electromagnetic forces between molecules such as ion-dipole interaction, dipole-dipole interaction, hydrogen bond, or van der Waals force) between molecules. The term "functional group interactive with silica" refers to a group having at least one atom interactive with silica such as a nitrogen atom, a sulfur atom, a phosphorus atom, or an oxygen atom.

The compound (R) is preferably a reaction product of an organic lithium compound and a nitrogen-containing compound such as a secondary amine compound, among others. Specific examples of the nitrogen-containing compound include dimethylamine, diethylamine, dipropylamine, dibutylamine, dodecamethyleneimine, N,N'-dimethyl-N'-trimethylsilyl-1,6-diaminohexane, piperidine, pyrrolidine, hexamethyleneimine, heptamethyleneimine, dicyclohexylamine, N-methylbenzylamine, di-(2-ethylhexyl)amine, diallylamine, morpholine, N-(trimethylsilyl)piperazine, N-(tert-butyldimethylsilyl)piperazine, and 1,3-ditrimethylsilyl-1,3,5-triazinane. The polymerization in the presence of the compound (R) may be carried out by preliminarily mixing an organic lithium compound with a compound (B1) to prepare a compound (R) and adding the compound (R) to the polymerization system, followed by polymerization. Alternatively, it may be carried out by adding an organic lithium compound and a compound (B1) to the polymerization system and mixing them in the polymerization system to prepare a compound (R), followed by polymerization.

(Method for Anionic Polymerization)

The production of the copolymer through anionic polymerization using the polymerization initiator may be carried out by any method including conventionally known methods.

Specifically, monomers, for example, styrene and 1,3-butadiene may be anionically polymerized in an organic solvent inert to the reaction, for example, a hydrocarbon solvent such as an aliphatic, alicyclic, or aromatic hydrocarbon compound, using a polymerization initiator such as butyllithium, optionally in the presence of a randomizer to produce a target copolymer, e.g. a styrene-butadiene copolymer.

(Hydrocarbon Solvent in Anionic Polymerization)

The hydrocarbon solvent is preferably a C3-C8 hydrocarbon solvent, and examples include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, and ethylbenzene. Each of these solvents may be used alone, or two or more of these may be used in admixture.

(Randomizer in Anionic Polymerization)

The randomizer refers to a compound that has the function of controlling the microstructure of the conjugated diene portion of a copolymer, for example, increase of 1,2-butadiene units or 3,4-isoprene units, or the function of controlling the compositional distribution of monomer units in a copolymer, for example, randomization of styrene units and butadiene units in a styrene-butadiene copolymer. The randomizer is not particularly limited, and any known compound commonly and conventionally used as a randomizer may be used. Examples include ethers and tertiary amines, such as dimethoxybenzene, tetrahydrofuran, dimethoxyethane, diethylene glycol dibutyl ether, diethylene glycol dimethyl ether, bis(tetrahydrofuryl)propane, triethylamine, pyridine, N-methylmorpholine, N,N,N',N'-tetramethylethylenediamine, and 1,2-dipiperidinoethane. Other examples include potassium salts such as potassium-t-amylate and potassium-t-butoxide; and sodium salts such as sodium-t-amylate. Each of these randomizers may be used alone, or two or more of these may be used in combination. The amount of the randomizer to be used per mol of the organic lithium compound is preferably 0.01 mole equivalents or more, more preferably 0.05 mole equivalents or more. If the amount of the randomizer is less than 0.01 mole equivalents, the added randomizer tends to produce a little effect, and thus randomization tends not to occur easily. The amount of the randomizer per mol of the organic lithium compound is also preferably 1,000 mole equivalents or less, more preferably 500 mole equivalents or less. If the amount of the randomizer is more than 1,000 mole equivalents, the reaction rate of monomers tends to change greatly, and randomization tends to be adversely affected.

The Tg of the copolymer can be controlled by varying the type or amount of the randomizer. For example, the Tg of the copolymer may be reduced by decreasing the amount of tetrahydrofuran.

(Reaction Temperature)

The anionic polymerization may be carried out at any reaction temperature as long as the reaction suitably proceeds.

Usually, the reaction temperature is preferably −10° C. to 100° C., more preferably 25° C. to 70° C.

(Modification Step)

The active terminal of the copolymer obtained by the above polymerization step may be reacted with a compound (B2) containing a functional group interactive with silica to introduce the functional group interactive with silica to the polymerization terminating terminal of the copolymer. This step allows the copolymer to have a modified polymerization terminating terminal. The term "terminal" herein refers to an end portion of the molecular chain, excluding monomer-derived structures containing carbon-carbon double bonds.

The copolymer used in the modification reaction (hereinafter, also referred to as terminal modification reaction) may be any copolymer which has an active terminal with an unmodified or modified polymerization initiating terminal. The compound (B2) may be any compound which contains a functional group interactive with silica and is reactable with the polymerization active terminal. Preferable specific examples of the compound (B2) include:

(I) a compound (B2-1) represented by the following formula (1):

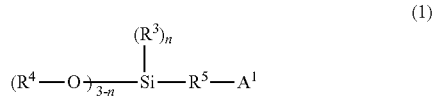

wherein $A^1$ represents a monovalent functional group which contains no active hydrogen but contains at least one selected from the group consisting of a nitrogen atom, a phosphorus atom, and a sulfur atom, and is bound to $R^5$ through a nitrogen atom, a phosphorus atom, or a sulfur atom; $R^3$ and $R^4$ each represent a hydrocarbyl group; $R^5$ represents a hydrocarbylene group; and n represents an integer of 0 to 2, provided that when two or more $R^3$ or $R^4$ groups are present, they may be the same or different;

(II) a compound (B2-2) that has, in the molecule, one or more functional groups (x1) of at least one type selected from the group consisting of a cyclic ether group, a (thio)carbonyl group, and an iso(thio)cyanate group, and one or more groups (x2) different from the functional groups (x1) which contains no active hydrogen but contains at least one selected from the group consisting of a nitrogen atom, a phosphorus atom, an oxygen atom, and a sulfur atom, provided that at least one of the nitrogen, phosphorus, and sulfur atoms may be protected by a trisubstituted hydrocarbylsilyl group; and (III) a compound (B2-3) having two or more iso(thio)cyanate groups in the molecule. Each of these compounds (B2) may be used alone, or two or more of these compounds (B2) may be used in combination. Herein, the term "(thio)carbonyl group" refers to a carbonyl group and a thiocarbonyl group; and the term "iso(thio)cyanate group" refers to an isocyanate group and an isothiocyanate group.

The hydrocarbyl group for $R^3$ and $R^4$ in formula (1) is preferably a linear or branched C1-C20 alkyl group, a C3-C20 cycloalkyl group, or a C6-C20 aryl group.

$R^5$ is preferably a linear or branched C1-C20 alkanediyl group, a C3-C20 cycloalkylene group, or a C6-C20 arylene group.

Preferably, n is 0 or 1 in order to increase the reactivity with the copolymer.

$A^1$ contains at least one selected from the group consisting of a nitrogen atom, a phosphorus atom, and a sulfur atom (hereinafter, also referred to as a specific atom), and is bound to $R^5$ through the specific atom. The specific atom is bound to no active hydrogen, and may be protected by, for example, a trisubstituted hydrocarbylsilyl group. The term "active hydrogen" herein refers to a hydrogen atom bound to an atom other than a carbon atom, and preferably refers to a hydrogen atom having a bond energy lower than the carbon-hydrogen bond of polymethylene.

Preferably, $A^1$ is a group that can be converted to an onium ion by the action of an onium salt-forming agent. The compound (B2) containing such a group ($A^1$) can impart excellent shape-retaining properties to the copolymer to be modified.

Specific examples of $A^1$ include a nitrogen-containing group in which two hydrogen atoms of a primary amino group are substituted by two protecting groups; a nitrogen-containing group in which one hydrogen atom of a secondary amino group is substituted by one protecting group; a tertiary amino group; an imino group; a pyridyl group; a phosphorus-containing group in which two hydrogen atoms of a primary phosphino group are substituted by two protecting groups; a phosphorus-containing group in which one hydrogen atom of a secondary phosphino group is substituted by one protecting group; a tertiary phosphino group; and a sulfur-containing group in which one hydrogen atom of a thiol group is substituted by one protecting group. Among these, groups containing a nitrogen atom are preferred because of their good affinity for silica. The term "protecting group" refers to a functional group that converts $A^1$ to a functional group inert to the polymerization active terminal, such as, for example, a trisubstituted hydrocarbylsilyl group.

Specific examples of the compound (B2-1) are described below. Examples of compounds containing both an alkoxysilyl group and a nitrogen-containing group in which two hydrogen atoms of a primary amine are substituted by two protecting groups, a nitrogen-containing group in which one hydrogen atom of a secondary amine is substituted by one protecting group, or a tertiary amino group include N,N-bis(trimethylsilyl)aminopropyltrimethoxysilane, N,N-bis(trimethylsilyl)aminopropylmethyldiethoxysilane, N,N',N'-tris(trimethylsilyl)-N-(2-aminoethyl)-3-aminopropyltriethoxysilane, and 3-(4-trimethylsilyl-1-piperazino)propylmethyldimethoxysilane Examples of compounds containing both an alkoxysilyl group and an imino group or a pyridyl group include N-(1,3-dimethylbutylidene)-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl)-1-propaneamine, and trimethoxysilyl, methyldiethoxysilyl, or ethyldimethoxysilyl compounds corresponding to the foregoing triethoxysilyl compounds, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, 3-hexamethyleneiminopropyltrimethoxysilane, 3-hexamethyleneiminopropylmethyldimethoxysilane, and the foregoing compounds whose alkyl group and alkanediyl group are replaced with a C1-C6 alkyl group and a C1-C6 alkanediyl group, respectively.

Examples of compounds containing both an alkoxysilyl group and a phosphorus-containing group in which two hydrogen atoms of a primary phosphino group are substituted by two protecting groups, a phosphorus-containing group in which one hydrogen atom of a secondary phosphino group is substituted by one protecting group, a tertiary phosphino group, or a sulfur-containing group in which one hydrogen atom of a thiol group is substituted by one protecting group include P,P-bis(trimethylsilyl)phosphinopropylmethyldimethoxysilane, P,P-bis(trimethylsilyl)phosphinopropyltrimethoxysilane, 3-dimethylphosphinopropyltrimethoxysilane, 3-dimethylphosphinopropylmethyldimethoxysilane, 3-diphenylphosphinopropyltrimethoxysilane, 3-diphenylphosphinopropyltriethoxysilane, 3-diphenylphosphinopropylmethyldimethoxysilane, S-trimethylsilylmercaptopropylmethyldimethoxysilane, S-trimethylsilylmercaptopropyltrimethoxysilane, S-trimethylsilylmercaptopropyltriethoxysilane, S-trimethylsilylmercaptopropylmethyldiethoxysilane, and the foregoing compounds whose alkyl group and alkanediyl group are replaced with a C1-C6 alkyl group and a C1-C6 alkanediyl group, respectively. In addition, examples of compounds containing an iso(thio)cyanate group include 3-isocyanatopropyltrimethoxysilane and 3-isocyanatopropyltriethoxysilane.

In the compound (B2-2), the group (x2) is preferably a group that contains a nitrogen atom bound to no active hydrogen. Specific examples of such compounds include:

compounds containing a cyclic ether group, such as epoxy amine compounds, e.g. tetraglycidyl-1,3-bisaminomethylcyclohexane, compounds containing a (thio)carbonyl group, such as 4-aminoacetophenones, e.g. 4-N,N-dimethylaminobenzophenone; bis(dihydrocarbylaminoalkyl)ketones, e.g. 1,7-bis(methylethylamino)-4-heptanone; dihydrocarbylaminoalkyl (meth)acrylates, e.g. 2-dimethylaminoethyl acrylate; hydrocarbylimidazolidinones, e.g. 1,3-dimethyl-2-imidazolidinone; N-hydrocarbylpyrrolidones, e.g. 1-phenyl-2-pyrrolidone; N-hydrocarbylcaprolactams, e.g. N-methyl-ε-caprolactam; N-dihydrocarbylformamides, e.g. N,N-diethylformamide; N,N-dihydrocarbylacetamides, e.g. N,N-dimethylacetamide; and (meth)acrylamides, e.g. N,N-dimethylacrylamide, and compounds containing an iso(thio)cyanate group, such as 3-isocyanatopropyltrimethoxysilane.

Examples of the compound (B2-3) include 2,4-tolylene diisocyanate, 2,6-tolylene diisocyanate, diphenylmethane diisocyanate, naphthalene diisocyanate, triphenylmethane triisocyanate, p-phenylene diisocyanate, tris(isocyanatophenyl)thiophosphate, xylene diisocyanate, benzene-1,2,4-triisocyanate, naphthalene-1,2,5,7-tetraisocyanate, and 1,4-phenylene diisothiocyanate.

In particular, the compound (B2) is preferably a compound (B2-1) because of its high affinity for silica. When a silane compound (B2-1) is used, for example, silicon tetrachloride or an epoxy-containing compound (e.g. tetraglycidyl-1,3-bisaminomethylcyclohexane) may be used with the silane compound (B2-1) to control the Mooney viscosity of the modified copolymer. The compounds (B2) mentioned above all have the same function in that they allow the resulting modified copolymer to have a modified polymerization terminating terminal. Accordingly, those which are not disclosed in the EXAMPLES later can also be used in the present invention. A structure represented by the formula (1-1) below is introduced to the polymer terminal by the reaction between the compound of formula (1) and the copolymer to be modified.

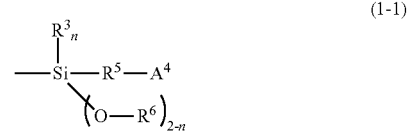

In formula (1-1), $R^6$ represents a hydrogen atom or a hydrocarbyl group, and when two or more $R^6$ groups are present, they may be the same or different. Examples of the hydrocarbyl group for $R^6$ include those listed above for $R^3$ and $R^4$ in formula (1). $A^4$, $R^3$, $R^5$ and n are as defined for $A^1$, $R^3$, $R^5$ and n, respectively, in formula (1).

The terminal modification reaction may be performed as a solution reaction, for example. The solution reaction may be carried out using the solution containing unreacted monomers obtained after completion of the polymerization reaction in the polymerization step, or a solution prepared by isolating the copolymer from the above solution and dissolving it in an appropriate solvent such as cyclohexane. The terminal modification reaction may be carried out either batchwise or continuously. Here, the compound (B2) may be added in any manner, such as at one time, in portions, or continuously.

The amount of the compound (B2) used in the terminal modification reaction may be selected appropriately according to the type of compound used in the reaction. The amount of the compound (B2) is preferably 0.1 mole equivalents or more, more preferably 0.3 mole equivalents or more relative to the metal atom of the polymerization initiator involved in the polymerization reaction. With 0.1 mole equivalents or more of the compound (B2), the modification reaction can proceed sufficiently, and the dispersibility of silica can be suitably improved.

The temperature of the terminal modification reaction is usually the same as the temperature of the polymerization reaction, and is preferably −20° C. to 150° C., more preferably 0° C. to 120° C., particularly preferably 20° C. to 100° C. If the temperature of the modification reaction is low, the viscosity of the modified copolymer tends to increase, while if the temperature of the modification reaction is high, the polymerization active terminal can be easily deactivated. The duration of the modification reaction is preferably one minute to five hours, more preferably two minutes to one hour.

(Termination of Reaction)

The anionic polymerization may be terminated by addition of a reaction terminator usually used in this technical field. Examples of the reaction terminator include polar solvents containing active protons such as acetic acid, and methanol, ethanol, isopropanol, and other alcohols, and mixtures of the foregoing. Other examples include mixtures of the foregoing polar solvents and non-polar solvents such as hexane or cyclohexane. Usually, the amount of the reaction terminator to be added is sufficient when it is about equal to or twice the molar amount of the initiator for anionic polymerization.

<Coupling>

In the method for producing the copolymer, a coupling agent may be added to the hydrocarbon solution of the copolymer at any time from the initiation of the polymerization of monomers until the polymer is recovered as described later. Examples of the coupling agent include compounds represented by the following formula (2-1):

$$R^1_a ML_{4-a} \quad (2-1)$$

wherein $R^1$ represents an alkyl group, an alkenyl group, a cycloalkenyl group, or an aryl group; M represents a silicon atom or a tin atom; L represents a halogen atom or a hydrocarbyloxy group; and a represents an integer of 0 to 2.

Examples of the coupling agent of formula (2-1) include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

In order to enhance the processability of the polymer, the amount of the coupling agent to be added is preferably 0.03 mol or more, more preferably 0.05 mol or more, per mol of the alkali metal derived from an alkali metal catalyst. In order to enhance fuel economy, the amount is preferably 0.4 mol or less, more preferably 0.3 mol or less.

<Hydrogenation Method>

In the method for producing the hydrogenated copolymer, the copolymer described above is hydrogenated to obtain a hydrogenated copolymer having a degree of hydrogenation of 75 mol % or more. The hydrogenation of the copolymer advantageously improves heat resistance. If the degree of hydrogenation is low, the effects of improving rubber tensile strength and abrasion resistance are not sufficiently achieved.

The hydrogenation may be carried out by any method under any reaction condition, including known methods and known conditions. Usually, the hydrogenation is carried out at 20° C. to 150° C. under 0.1 to 10 MPa hydrogen pressure in the presence of a hydrogenation catalyst. The degree of hydrogenation can be selected by changing, for example, the amount of the hydrogenation catalyst, the hydrogen pressure during the hydrogenation reaction, or the duration of the reaction. The hydrogenation catalyst used may be usually a compound containing any of the metals of groups 4 to 11 of the periodic table. For example, compounds containing any of Ti, V, Co, Ni, Zr, Ru, Rh, Pd, Hf, Re, and Pt atoms can be used as the hydrogenation catalyst. More specific examples of the hydrogenation catalyst include metallocene compounds containing Ti, Zr, Hf, Co, Ni, Pd, Pt, Ru, Rh, Re, or other metals; supported heterogeneous catalysts in which a metal such as Pd, Ni, Pt, Rh, or Ru is supported on a carrier such as carbon, silica, alumina, or diatomaceous earth; homogeneous Ziegler catalysts in which an organic salt or acetylacetone salt of a metal element such as Ni or Co is combined with a reducing agent such as an organoaluminum; organometallic compounds or complexes of Ru, Rh, or other metals; and fullerenes and carbon nanotubes in which hydrogen is stored.

Among the above exemplary compounds, metallocene compounds containing Ti, Zr, Hf, Co, or Ni are preferred because they allow the hydrogenation reaction to be carried out in a homogeneous system in an inert organic solvent. More preferred are metallocene compounds containing Ti, Zr, or Hf. In particular, hydrogenation catalysts obtained by reaction of titanocene compounds and alkyllithiums are preferred because such catalysts are inexpensive and industrially very useful. Specific examples include hydrogenation catalysts described in, for example, JP H1-275605 A, JP H5-271326 A, JP H5-271325 A, JP H5-222115 A, JP H11-292924 A, JP 2000-37632 A, JP S59-133203 A, JP S63-5401 A, JP S62-218403 A, JP H7-90017 A, JP S43-19960 B, and JP S47-40473 B, the disclosures of which are incorporated by reference herein. Each of these hydrogenation catalysts may be used alone, or two or more of these may be used in combination.

The amount of the hydrogenated copolymer based on 100% by mass of the rubber component is 75% by mass or more, preferably 80% by mass or more, more preferably 90% by mass or more, still more preferably 100% by mass. With less than 75% by mass of the hydrogenated copolymer, the effects of improving rubber tensile strength and abrasion resistance (especially rubber tensile strength) tend not to be easily achieved.

In particular, in the case where the hydrogenated copolymer is a hydrogenated styrene-butadiene copolymer, the amount of the hydrogenated styrene-butadiene copolymer based on 100% by mass of the rubber component is preferably 90% by mass or more, more preferably 95% by mass or more, still more preferably 100% by mass.

Examples of other rubbers that may be used in addition to the hydrogenated copolymer include conventional styrene-butadiene copolymer rubber (SBR), polybutadiene rubber (BR), butadiene-isoprene copolymer rubber, and butyl rubber. Other examples include natural rubber (NR), ethylene-propylene copolymers, and ethylene-octene copolymers. Two or more of these rubbers may be used in combination.

In the case where the rubber component includes NR, non-limiting examples of the NR include those commonly used in the tire industry, such as SIR20, RSS#3, and TSR20.

The amount of NR based on 100% by mass of the rubber component is preferably 5% by mass or more. The amount of NR is also preferably 25% by mass or less, more preferably 15% by mass or less. The incorporation of NR in the range indicated above provides good fuel economy, so that a better balance of fuel economy, rubber tensile strength, and abrasion resistance is obtained.

The rubber composition in the present invention contains a sulfur donor as a vulcanizing agent (crosslinking agent). Although the use of the hydrogenated copolymer with a high degree of hydrogenation may lead to insufficient cure rate, incorporating a sulfur donor together with the hydrogenated copolymer improves cure rate, without impairing the effects of the hydrogenated copolymer in improving fuel economy, rubber tensile strength, and abrasion resistance. Moreover, the sulfur donor further improves fuel economy.

The sulfur donor may be a sulfur-containing compound that has a crosslinking effect. Examples include dithiophosphate compounds (dithiophosphate polysulfides) represented by the formula (I) below and thiuram vulcanization accelerators. It should be noted that the silane coupling agents to be incorporated (added) in the final kneading step also correspond to the sulfur donors, whereas the silane coupling agents to be incorporated in the base kneading step do not correspond to the sulfur donors because they react preferentially with silica. It should also be noted that the sulfurs commonly used for vulcanization in the rubber field do not correspond to the sulfur donors.

Preferable examples of the sulfur donor are dithiophosphate compounds represented by the formula (I) below, thiuram vulcanization accelerators, and the silane coupling agents to be incorporated (added) in the final kneading step because their combined use with the hydrogenated copolymer has a significant improvement effect.

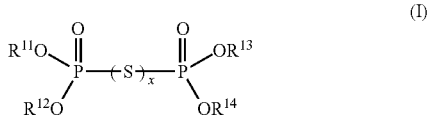

(I)

In formula (I), x represents an integer of 1 or more, and $R^{11}$ to $R^{14}$ are the same as or different from one another and each represent a branched or unbranched C1-C18 alkyl group or a C5-C12 cycloalkyl group.

In formula (I), $R^{11}$ to $R^{14}$ are the same as or different from one another and each represent a branched or unbranched C1-C18 alkyl group or a C5-C12 cycloalkyl group. Examples of the branched or unbranched alkyl group for $R^{11}$ to $R^{14}$ include methyl, ethyl, n-propyl, iso-propyl, n-butyl, 4-methylpentyl, 2-ethylhexyl, octyl, and octadecyl groups, while examples of the cycloalkyl group include cyclopentyl, cyclohexyl, and cyclooctyl groups. In view of ease of dispersion in the rubber composition and ease of production, each of $R^{11}$ to $R^{14}$ is preferably a branched or unbranched C2-C14, preferably C5-C11 alkyl group, and more preferably a 2-ethylhexyl, n-butyl, n-propyl, iso-propyl, or n-octyl group.

In formula (I), x represents an integer of 1 or more, and is preferably 2 or more, more preferably 3 or more, because such compounds can supply a sufficient amount of sulfur to the rubber composition and also have excellent thermal stability. The upper limit of x is not particularly limited but is preferably about 10 or less.

Examples of the dithiophosphate compounds of formula (I) include SDT-50 and SDT-S both available from RheinChemie and similar compounds such as those in which $R^{11}$ to $R^{14}$ are n-butyl groups). Each of these compounds may be used alone, or two or more of these may be used in combination.

Examples of thiuram vulcanization accelerators which can be used as the sulfur donor include compounds represented by the following formula (II):

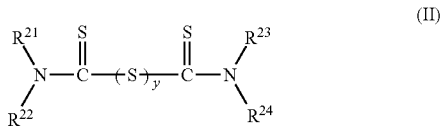

(II)

wherein y represents an integer of 1 or more, and $R^{21}$ to $R^{24}$ are the same as or different from one another and each represent a C1-C30 hydrocarbyl group, and $R^{21}$ and $R^{22}$, or $R^{23}$ and $R^{24}$, may be joined together to form a ring.

In formula (II), $R^{21}$ to $R^{24}$ are the same as or different from one another and each represent a C1-C30, preferably C1-C15, more preferably C1-C10 hydrocarbyl group. Examples of the hydrocarbyl group include alkyl groups such as methyl, ethyl, propyl, butyl, pentyl, hexyl, heptyl, and octyl groups; cycloalkyl groups such as cyclopentyl and cyclohexyl groups; aryl groups such as phenyl, tolyl, and xylyl groups; aralkyl groups such as benzyl and phenethyl groups; and alkenyl groups such as vinyl, allyl, butenyl, pentenyl, and hexenyl groups. In order to suitably achieve the effects of the present invention, especially proper cure time, the hydrocarbyl group is preferably an aralkyl group, more preferably a benzyl group.

In formula (II), y represents an integer of 1 or more, preferably 1 to 10, more preferably 2 to 4.

Examples of the thiuram vulcanization accelerators of formula (II) include tetrabenzylthiuram disulfide (TBzTD), tetramethylthiuram disulfide (TMTD), tetraethylthiuram disulfide, tetramethylthiuram monosulfide (TMTM), dipentamethylenethiuram disulfide, dipentamethylenethiuram monosulfide, dipentamethylenethiuram tetrasulfide, dipentamethylenethiuram hexasulfide, tetrabutylthiuram disulfide, and pentamethylenethiuram tetrasulfide. Each of these compounds may be used alone, or two or more of these may be used in combination. In order to suitably achieve the effects of the present invention, especially proper cure time, the thiuram vulcanization accelerator is preferably tetrabenzylthiuram disulfide.

The silane coupling agent that can be used as the sulfur donor (silane coupling agent to be incorporated (added) in the final kneading step) may be a conventionally known one, and examples include: sulfide silane coupling agents such as bis(3-triethoxysilylpropyl)tetrasulfide, bis(2-triethoxysilylethyl)tetrasulfide, bis(3-trimethoxysilylpropyl)tetrasulfide, bis(2-trimethoxysilylethyl)tetrasulfide, bis(3-triethoxysilylpropyl)trisulfide, bis(3-trimethoxysilylpropyl)trisulfide, bis(3-triethoxysilylpropyl)disulfide, bis(3-trimethoxysilylpropyl)disulfide, 3-trimethoxysilylpropyl-N,N-dimethylthiocarbamoyltetrasulfide, 3-trimethoxysilylpropylbenzothiazolyltetrasulfide, 3-triethoxysilylpropylbenzothiazoletetrasulfide, 3-triethoxysilylpropyl methacrylate monosulfide, and 3-trimethoxysilylpropyl methacrylate monosulfide; mercapto silane coupling agents such as 3-mercaptopropyltrimethoxysilane, 3-mercaptopropyltriethoxysilane, 2-mercaptoethyltrimethoxysilane, and 2-mercaptoethyltriethoxysilane; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro silane coupling agents such as 3-nitropropyltrimethoxysilane and 3-nitropropyltriethoxysilane; and chloro silane coupling agents such as 3-chloropropyltrimethoxysilane, 3-chloropropyltriethoxysilane, 2-chloroethyltrimethoxysilane, and 2-chloroethyltriethoxysilane. Each of these silane coupling agents may be used alone, or two or more of these may be used in combination. In order to suitably achieve the effects of the present invention, especially proper cure time, the silane coupling agent is preferably a sulfide silane coupling agent, more preferably bis(3-triethoxysilylpropyl)tetrasulfide or bis(3-triethoxysilylpropyl)disulfide.

The amount of the sulfur donor per 100 parts by mass of the rubber component is preferably 0.2 to 8 parts by mass, more preferably 0.2 to 6 parts by mass, still more preferably 0.2 to 4 parts by mass. With the sulfur donor in the range indicated above, the effects of the present invention, especially proper cure time, can be suitably achieved.

When the sulfur donor is in the form of a mixture with other components, the amount of the sulfur donor refers to the amount of the active ingredient in the sulfur donor.

The rubber composition in the present invention preferably contains silica. Non-limiting examples of the silica include dry silica (anhydrous silica) and wet silica (hydrous silica). Wet silica is preferred because it contains a large number of silanol groups.

The silica preferably has a nitrogen adsorption specific surface area ($N_2SA$) of 45 m$^2$/g or more, more preferably 55 m²/g or more, still more preferably 60 m²/g or more, particularly preferably 100 m²/g or more, most preferably 150 m²/g or more. With silica having a $N_2SA$ of less than 45 m²/g, abrasion resistance or rubber tensile strength may deteriorate. The $N_2SA$ of the silica is also preferably 350 m²/g or less, more preferably 300 m²/g or less, still more preferably 270 m²/g or less, particularly preferably 220 m²/g or less. Silica having a $N_2SA$ of more than 350 m²/g may be difficult to disperse, thereby leading to deterioration of fuel economy.

The nitrogen adsorption specific surface area of the silica is determined by the BET method in conformity with ASTM D3037-81.

In the case where the rubber composition in the present invention contains silica, the amount of the silica per 100 parts by mass of the rubber component is preferably 1 part by mass or more, more preferably 10 parts by mass or more, still more preferably 30 parts by mass or more, particularly preferably 45 parts by mass or more. If the amount is less than 1 part by mass, the incorporation of silica tends to have an insufficient effect resulting in deterioration of fuel economy or abrasion resistance. The amount of the silica is preferably 200 parts by mass or less, more preferably 150 parts by mass or less, still more preferably 120 parts by mass or less, particularly preferably 100 parts by mass or less. If the amount is more than 200 parts by mass, the silica tends not to disperse readily, thereby resulting in deterioration of fuel economy, processability, and abrasion resistance.

The rubber composition in the present invention preferably contains another filler in addition to silica. The term "filler" herein refers to a material that is incorporated into the rubber composition to reinforce rubber. Examples include white fillers such as calcium carbonate, mica (e.g. sericite), aluminum hydroxide, magnesium oxide, magnesium hydroxide, clay, talc, alumina, and titanium oxide, and carbon black. Two or more of these fillers may be used in combination. For reinforcement, carbon black is particularly preferably incorporated.

In the case where the rubber composition in the present invention contains another filler in addition to silica, the amount of the silica based on 100% by mass of the total filler is preferably 80% by mass or more, more preferably 90% by mass or more. If the amount is less than 80% by mass, the effects of the present invention may not be sufficiently achieved. Also in this case, the use of carbon black as the other filler tends to deteriorate wet grip performance, while the use of filler other than carbon black may lead to deterioration of abrasion resistance.

In the case where the rubber composition in the present invention contains carbon black, examples of the carbon black include furnace blacks (furnace carbon blacks) such as SAF, ISAF, HAF, MAF, FEF, SRF, GPF, APF, FF, CF, SCF, and ECF; acetylene blacks (acetylene carbon blacks); thermal blacks (thermal carbon blacks) such as FT and MT; channel blacks (channel carbon blacks) such as EPC, MPC, and CC; and graphite. Each of these carbon blacks may be used alone, or two or more of these may be used in combination.

The carbon black usually has a nitrogen adsorption specific surface area ($N_2SA$) of 5 to 200 m²/g. The lower limit is preferably 50 m²/g, more preferably 80 m²/g, while the upper limit is preferably 150 m²/g, more preferably 120 m²/g. The carbon black also usually has a dibutyl phthalate (DBP) absorption of 5 to 300 mL/100 g. The lower limit is preferably 80 mL/100 g, while the upper limit is preferably 180 mL/100 g. Carbon black having a $N_2SA$ or DBP absorption of less than the lower limit of the range indicated above tends to have only a small reinforcing effect, resulting in reduced abrasion resistance. Carbon black having a $N_2SA$ or DBP absorption of more than the upper limit of the range tends to disperse poorly, resulting in increased hysteresis loss and reduced fuel economy.

The nitrogen adsorption specific surface area is measured in conformity with ASTM D4820-93. The DBP absorption is measured in conformity with ASTM D2414-93.

In the case where the rubber composition in the present invention contains carbon black, the amount of the carbon black per 100 parts by mass of the rubber component is preferably 1 part by mass or more, more preferably 3 parts by mass or more. If the amount is less than 1 part by mass, sufficient reinforcing properties may not be obtained. The amount of the carbon black is preferably 60 parts by mass or less, more preferably 30 parts by mass or less, still more preferably 15 parts by mass or less. If the amount is more than 60 parts by mass, fuel economy tends to deteriorate.

The rubber composition in the present invention preferably incorporates a silane coupling agent together with silica.

Examples of the silane coupling agent to be used with silica (silane coupling agent to be incorporated (added) in the base kneading step) include those mentioned above for the sulfur donor. In view of the coupling effect produced by the silane coupling agent, processability, and cost, the silane coupling agent is preferably a sulfide silane coupling agent, more preferably bis(3-triethoxysilylpropyl)tetrasulfide or bis(3-triethoxysilylpropyl)disulfide.

The amount of the silane coupling agent to be used with silica, per 100 parts by mass of the silica, is preferably 3 parts by mass or more, more preferably 5 parts by mass or more. If the amount is less than 3 parts by mass, the coupling effect tends to be insufficient, failing to provide high dispersion of silica, and the effects of the present invention also tend not to be sufficiently achieved. Therefore, fuel economy or rubber tensile strength may be reduced. The amount of the silane coupling agent to be used with silica, per 100 parts by mass of the silica, is also preferably 15 parts by mass or less, more preferably 10 parts by mass or less. If the amount is more than 15 parts by mass, excess silane coupling agents may be left in the rubber composition, causing reduction in the processability and tensile properties of the rubber composition.

The amount of the silane coupling agent discussed here is the amount of the silane coupling agent to be incorporated (added) in the base kneading step and excludes the silane coupling agent incorporated as a sulfur donor (silane coupling agent to be incorporated (added) in the final kneading step).

The rubber composition in the present invention may incorporate compounding agents conventionally used in the rubber industry in addition to the above-described components. Examples include sulfur; vulcanization accelerators; vulcanization activators such as stearic acid and zinc oxide; organic peroxides; processing aids such as extender oil (oil) and lubricants; and antioxidants.

Examples of the sulfur include powdered sulfur, precipitated sulfur, colloidal sulfur, insoluble sulfur, and highly dispersible sulfur. The amount of the sulfur per 100 parts by mass of the rubber component is preferably 0.5 to 5 parts by mass, more preferably 1 to 3 parts by mass.

Examples of the vulcanization accelerators include sulfenamide, thiazole, thiourea, guanidine, dithiocarbamate, aldehyde-amine or aldehyde-ammonia, imidazoline, and xanthate vulcanization accelerators. Preferred among these are sulfenamide vulcanization accelerators.

In the present invention, thiuram vulcanization accelerators are regarded as the sulfur donors described above because, unlike the other vulcanization accelerators, they have a structure that liberates sulfur during vulcanization.

Examples of the sulfenamide vulcanization accelerators include N-tert-butyl-2-benzothiazolylsulfenamide (TBBS), N-cyclohexyl-2-benzothiazolylsulfenamide (CBS), and N,N'-dicyclohexyl-2-benzothiazolylsulfenamide (DZ). Preferred among these is TBBS. Further, it is also preferably used in combination with guanidine vulcanization accelerators such as N,N'-diphenylguanidine. The amount of the vulcanization accelerator (excluding thiuram vulcanization accelerators) per 100 parts by mass of the rubber component is preferably 0.1 to 5 parts by mass, more preferably 0.2 to 4 parts by mass.

Examples of the extender oil (oil) include aromatic mineral oils (viscosity gravity constant (V.G.C.): 0.900 to 1.049), naphthenic mineral oils (V.G.C.: 0.850 to 0.899), and paraffinic mineral oils (V.G.C.: 0.790 to 0.849). The polycyclic aromatic content of the extender oil is preferably less than 3% by mass, more preferably less than 1% by mass. The polycyclic aromatic content is measured in conformity with the Institute of Petroleum (IP, U.K.) 346/92 method. The aromatic content (CA) of the extender oil is preferably 20% by mass or more. Two or more of these extender oils may be used in combination.

The rubber composition in the present invention can be used for various tire components, such as treads, sidewalls, carcasses, belts, beads, clinches, or chafers, and is especially suitable for treads of tires. A two-layer tread consists of an outer surface layer (cap tread) and an inner surface layer (base tread).

A multi-layer tread may be produced by assembling sheet-shaped rubber compositions into a predetermined shape, or by feeding rubber compositions into two or more extruders and forming them into a two- or more-layered product at the head outlet of the extruders.

The rubber composition in the present invention may be prepared by a method including: a base kneading step of kneading the rubber component including the hydrogenated copolymer, and a final kneading step of adding the sulfur donor to the kneadate obtained in the base kneading step and kneading them. Kneading may be carried out in any manner, for example, using a Banbury mixer, a kneader, or an open roll mill.

In the base kneading step, carbon black, oil, silica, silane coupling agents, antioxidants, stearic acid, zinc oxide, wax, and other components may optionally be introduced and kneaded with the rubber component. In the base kneading step, kneading is carried out at a temperature of preferably 80 to 180° C. for preferably three to ten minutes.

In the final kneading step, sulfur, vulcanization accelerators, and other components may optionally be introduced and kneaded with the kneadate obtained in the base kneading step and the sulfur donor. In the final kneading step, kneading is carried out at a temperature of preferably 30 to 100° C. for preferably three to ten minutes.

The pneumatic tire of the present invention can be produced as follows: the unvulcanized rubber composition obtained in the final kneading step is extruded into the shape of a desired tire component such as a tread and assembled with other tire components on a tire building machine in a conventional manner to build an unvulcanized tire, which is then heat-pressed in a vulcanizer to produce a pneumatic tire of the present invention.

The pneumatic tire of the present invention is suitable for passenger vehicles, trucks and buses, two-wheeled vehicles, racing vehicles, and other vehicles, and especially for passenger vehicles.

EXAMPLES

The present invention is specifically described with reference to, but not limited to, examples below.

The chemicals used in the synthesis or polymerization are listed below. The chemicals were purified as needed by conventional techniques.

n-Hexane: product of Kanto Chemical Co., Inc.
Styrene: product of Kanto Chemical Co., Inc.
Butadiene: 1,3-butadiene available from Tokyo Chemical Industry Co., Ltd.
THF: tetrahydrofuran available from Kanto Chemical Co., Inc.
n-Butyllithium solution: 1.6 M solution of n-butyllithium in hexane available from Kanto Chemical Co., Inc.
Ethanol: product of Kanto Chemical Co., Inc.
2,6-Di-tert-butyl-p-cresol: Nocrac 200 available from Ouchi Shinko Chemical Industrial Co., Ltd.
Amine modifier: N,N-bis(trimethylsilyl)-aminopropylmethyldiethoxysilane The methods for evaluating the prepared copolymers are collectively described below.

(Measurement of Degree of Hydrogenation of Conjugated Diene Portion of Copolymer)

A 15% by mass solution of each copolymer in carbon tetrachloride was prepared to measure a $^1$H-NMR spectrum at 100 MHz. The degree of hydrogenation was calculated from the rate of decrease in the intensity of the $^1$H-NMR spectrum corresponding to unsaturated bonds.

(Measurement of Styrene Content)

A $^1$H-NMR spectrum was measured using a JEOL JNM-A 400 NMR device at 25° C. The ratio of phenyl protons of the styrene unit at 6.5 to 7.2 ppm to vinyl protons of the butadiene unit at 4.9 to 5.4 ppm was determined based on the spectrum. The styrene content was calculated from the ratio.

(Measurement of Weight Average Molecular Weight (Mw) and Number Average Molecular Weight (Mn))

The weight average molecular weight (Mw) and number average molecular weight (Mn) of each copolymer were determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards. In the case of copolymers containing a modifying group, the Mw and Mn were measured before the copolymers were modified. This is because the Mw and Mn of copolymers containing a modifying group cannot be accurately determined due to the interaction between the modifying group and the silica gel in the column.

(Measurement of Glass Transition Temperature (Tg))

The glass transition temperature (Tg) was defined as the glass transition onset temperature measured using a differential scanning calorimeter (Q200 available from TA Instruments, Japan) at a temperature increase rate of 10° C./min in conformity with JIS K 7121.

Copolymer Production Examples

Synthesis Example 1 (Synthesis of Copolymer (1): SBR with a Degree of Hydrogenation of 0 Mol %)

To a sufficiently nitrogen-purged heat-resistant reaction vessel were charged 2,000 mL of n-hexane, 60 g of styrene, 140 g of butadiene, 2.5 g of THF, and 0.45 mmol of n-butyllithium, followed by stirring at 50° C. for five hours to cause a polymerization reaction. After the reaction was terminated by addition of ethanol, 1 g of 2,6-di-tert-butyl-p-cresol was added to the reaction solution. The resulting solution was purified by reprecipitation to obtain copolymer (1). The copolymer (1) had a weight average molecular weight (Mw) of 490,000 and a styrene content of 30% by mass.

Synthesis Example 2 (Synthesis of Copolymer (2): Hydrogenated SBR with a Degree of Hydrogenation of 60 Mol %)

Copolymer (2) was produced as in the synthesis of copolymer (1), except that the obtained polymer was hydrogenated. Specifically, after the polymerization conversion reaction in the synthesis of copolymer (1), the polymerization reaction was not terminated by addition of ethanol. Instead, the reaction solution was then stirred for 20 minutes while supplying hydrogen gas at a pressure of 0.4 MPa gauge to react the unreacted polymer terminal lithium with hydrogen into lithium hydride. Hydrogenation was carried out using a titanocene dichloride-based catalyst at a hydrogen gas supply pressure of 0.7 MPa gauge and a reaction temperature of 90° C. Once the cumulative amount of absorbed hydrogen reached the amount corresponding to the target degree of hydrogenation, the reaction temperature was brought to room temperature and the hydrogen pressure was returned to an ordinary pressure. Thereafter, the reaction solution was drawn from the reaction vessel and introduced into water with stirring. The solvent was removed by steam stripping to obtain copolymer (2). The copolymer (2) had a degree of hydrogenation of 60 mol % and a weight average molecular weight (Mw) of 500,000.

Synthesis Example 3 (Synthesis of Copolymer (3): Hydrogenated SBR with a Degree of Hydrogenation of 80 Mol %)

Copolymer (3) was produced as in the synthesis of copolymer (2), except that the cumulative amount of absorbed hydrogen was adjusted so as to correspond to the target degree of hydrogenation. The copolymer (3) had a degree of hydrogenation of 80 mol % and a weight average molecular weight (Mw) of 520,000.

Synthesis Example 4 (Synthesis of Copolymer (4): Hydrogenated SBR with a Degree of Hydrogenation of 95 Mol %)

Copolymer (4) was produced as in the synthesis of copolymer (2), except that the cumulative amount of absorbed hydrogen was adjusted so as to correspond to the target degree of hydrogenation. The copolymer (4) had a degree of hydrogenation of 95 mol % and a weight average molecular weight (Mw) of 490,000.

Synthesis Example 5 (Synthesis of Copolymer (5): Hydrogenated Modified SBR with a Degree of Hydrogenation of 95 Mol %)

To a sufficiently nitrogen-purged heat-resistant reaction vessel were charged 2,000 mL of n-hexane, 60 g of styrene, 140 g of 1,3-butadiene, 2.5 g of THF, and 0.45 mmol of n-butyllithium, followed by stirring at 50° C. for five hours to cause a polymerization reaction. Then, 0.15 mol of an amine modifier was added and stirred at 0° C. for one hour. The subsequent procedure was as described in the synthesis of copolymer (2), except for the adjustment of the cumulative amount of absorbed hydrogen, thereby obtaining copolymer (5). The copolymer (5) had a degree of hydrogenation of 95 mol % and a weight average molecular weight (Mw) before the modification of 510,000.

TABLE 1

|  | Copolymer (1) | Copolymer (2) | Copolymer (3) | Copolymer (4) | Copolymer (5) |
| --- | --- | --- | --- | --- | --- |
| Degree of hydrogenation (mol %) | 0 | 60 | 80 | 95 | 95 |
| Styrene content (% by mass) | 30 | 30 | 30 | 30 | 30 |
| Butadiene content (% by mass) | 70 | 70 | 70 | 70 | 70 |
| Weight average molecular weight (Mw) | 490,000 | 500,000 | 520,000 | 490,000 | 510,000 |
| Mw/Mn | 1.18 | 1.19 | 1.22 | 1.18 | 1.21 |
| Glass transition temperature (Tg) (° C.) | −30 | −31 | −30 | −30 | −30 |

The chemicals used in the examples and comparative examples are described below.

Copolymers (1) to (5): copolymers synthesized as above

Natural rubber: TSR20

Carbon black: Diablack N339 ($N_2SA$: 96 $m^2/g$, DBP absorption: 124 mL/100 g) available from Mitsubishi Chemical Corporation Oil: X-140 available from JX Nippon Oil & Energy Corporation Silica: ULTRASIL VN3 ($N_2SA$: 180 $m^2/g$) available from Evonik Silane coupling agent: Si69 (bis(3-triethoxysilylpropyl) tetrasulfide) available from Evonik Antioxidant: Antigene 3C available from Sumitomo Chemical Co., Ltd.

Stearic acid: stearic acid beads "TSUBAKI" available from NOF Corporation

Zinc oxide: zinc oxide #1 available from Mitsui Mining & Smelting Co., Ltd.

Wax: Sunnoc N available from Ouchi Shinko Chemical Industrial Co., Ltd.

Sulfur: Sulfur powder available from Tsurumi Chemical Industry Co., Ltd.

Sulfur donor (1): SANCELER TBZTD (tetrabenzylthiuram disulfide, a thiuram vulcanization accelerator of formula (II) where $R^{21}$ to $R^{24}$ are benzyl groups and y is 2) available from Sanshin Chemical Industry Co., Ltd.

Sulfur donor (2): SDT-50 (a dithiophosphate compound of formula (I) where $R^{11}$ to $R^{14}$ are 2-ethylhexyl groups and x is 1 or more, active ingredient content: 50% by mass) available from RheinChemie Sulfur donor (3): SDT-S (a dithiophosphate compound of formula (1) where $R^{11}$ to $R^{14}$ are 2-ethylhexyl groups and x is 1 or more, active ingredient content: 50% by mass) available from RheinChemie Sulfur donor (4): Si69 (bis(3-triethoxysilyl-propyl)tetrasulfide) available from Evonik Vulcanization accelerator (1): Soxinol CZ (N-cyclohexyl-2-benzothiazolylsulfenamide) available from Sumitomo Chemical Co., Ltd.

Vulcanization accelerator (2): Soxinol D (1,3-diphenylguanidine) available from Sumitomo Chemical Co., Ltd.

Examples and Comparative Examples

According to the formulations shown in Tables 2 to 6, the materials other than the sulfur, sulfur donor, and vulcanization accelerators were kneaded for five minutes at 150° C. using a 1.7-L Banbury mixer (available from Kobe Steel, Ltd.) to give a kneadate (base kneading step). Next, the sulfur, sulfur donor, and vulcanization accelerators were added to the kneadate, followed by kneading for five minutes at 80° C. using an open roll mill to give an unvulcanized rubber composition (final kneading step). The unvulcanized rubber composition was press-vulcanized for 20 minutes at 170° C. in a 0.5 mm-thick die to obtain a vulcanized rubber composition.

The values in the sections of sulfur donors (2) and (3) in Tables 2 to 6 are the amounts of the active ingredient.

<Evaluation Items and Test Methods>

The vulcanized rubber compositions prepared as above were evaluated for the following items. Tables 2 to 6 show the results.

(Rubber Tensile Strength)

The vulcanized rubber compositions were subjected to a tensile test in conformity with JIS K 6251 to measure the elongation at break. The results are expressed as an index, with Comparative Example 1 set equal to 100. A higher index indicates higher rubber tensile strength.

(Rubber tensile strength index)=(Rubber tensile strength measured for each formulation example)/(Rubber tensile strength measured for Comparative Example 1)×100

(Abrasion Resistance)

The volume loss of each vulcanized rubber composition was measured with a laboratory abrasion and skid tester (LAT tester) at a load of 50 N, a speed of 20 km/h, and a slip angle of 5 degrees. The volume losses are expressed as an index, with Comparative Example 1 set equal to 100. A higher index indicates better abrasion resistance.

(Fuel Economy)

The tan δ of the vulcanized rubber compositions was measured at a dynamic strain amplitude of 1%, a frequency of 10 Hz, and a temperature of 50° C. using a spectrometer (available from Ueshima Seisakusho Co., Ltd.). The reciprocals of the tan δ values are expressed as an index, with Comparative Example 1 set equal to 100. A higher index indicates a smaller rolling resistance, which means better fuel economy.

(Cure Rate)

A cure curve of each rubber composition at 160° C. was obtained using a curelastometer in conformity with JIS K6300-2:2001. The maximum torque (Fmax) and the minimum torque (Fmin) of the cure curve were determined to calculate a value of Tc(90)−Tc(10) where the 10% cure time Tc(10) is the time (min) required for the torque to reach a value equal to {(Fmax−Fmin)×0.1+Fmin} and the 90% cure time Tc(90) is the time (min) required for the torque to reach a value equal to {(Fmax−Fmin)×0.9+Fmin}. This value (Tc(90)−Tc(10)) is defined as the cure rate. The results are expressed as an index, with Comparative Example 1 set equal to 100. A higher index indicates a higher cure rate. Indices between 80 and 120 are considered good.

TABLE 2

| | | Degree of hydrogenation (mol %) | Comparative Example | | | | | | |
|---|---|---|---|---|---|---|---|---|---|
| | | | 1 | 2 | 3 | 4 | 5 | 6 | 7 |
| Formulation (parts by mass) | Copolymer (1) | 0 | 100 | — | — | — | — | — | — |
| | Copolymer (2) | 60 | — | 100 | — | — | — | — | — |
| | Copolymer (3) | 80 | — | — | 100 | — | — | — | — |
| | Copolymer (4) | 95 | — | — | — | 100 | — | — | — |
| | Copolymer (5) | 95 | — | — | — | — | 100 | 90 | 70 |
| | Natural rubber | — | — | — | — | — | — | 10 | 30 |
| | Carbon black | — | 5 | 5 | 5 | 5 | 5 | 5 | 5 |
| | Oil | — | 25 | 25 | 25 | 25 | 25 | 25 | 25 |
| | Silica | — | 75 | 75 | 75 | 75 | 75 | 75 | 75 |
| | Silane coupling agent | — | 6 | 6 | 6 | 6 | 6 | 6 | 6 |
| | Antioxidant | — | 1.5 | 1.5 | 1.5 | 1.5 | 1.5 | 1.5 | 1.5 |
| | Stearic acid | — | 2 | 2 | 2 | 2 | 2 | 2 | 2 |
| | Zinc oxide | — | 2.5 | 2.5 | 2.5 | 2.5 | 2.5 | 2.5 | 2.5 |
| | Wax | — | 1 | 1 | 1 | 1 | 1 | 1 | 1 |
| | Sulfur | — | 2 | 2 | 2 | 2 | 2 | 2 | 2 |
| | Sulfur donor (1) | — | — | — | — | — | — | — | — |
| | Sulfur donor (2) | — | — | — | — | — | — | — | — |
| | Sulfur donor (3) | — | — | — | — | — | — | — | — |
| | Sulfur donor (4) | — | — | — | — | — | — | — | — |
| | Vulcanization accelerator (1) | — | 1.8 | 1.8 | 1.8 | 1.8 | 1.8 | 1.8 | 1.8 |
| | Vulcanization accelerator (2) | — | 1.2 | 1.2 | 1.2 | 1.2 | 1.2 | 1.2 | 1.2 |
| Evaluation | Rubber tensile strength index | — | 100 | 135 | 195 | 210 | 212 | 147 | 84 |
| | Abrasion resistance index | — | 100 | 103 | 120 | 135 | 138 | 130 | 115 |
| | Fuel economy index | — | 100 | 101 | 99 | 99 | 108 | 104 | 100 |
| | Cure rate index | — | 100 | 71 | 51 | 48 | 46 | 59 | 66 |

TABLE 3

| | | Degree of hydrogenation (mol %) | Comparative Example 8 | Example 1 | Example 2 | Example 3 | Example 4 | Example 5 | Example 6 | Example 7 | Comparative Example 9 | Comparative Example 10 |
|---|---|---|---|---|---|---|---|---|---|---|---|---|
| Formulation (parts by mass) | Copolymer (1) | 0 | — | — | — | — | — | — | — | — | — | — |
| | Copolymer (2) | 60 | — | — | — | — | — | — | — | — | 100 | — |
| | Copolymer (3) | 80 | — | — | — | — | — | — | — | 100 | — | — |
| | Copolymer (4) | 95 | — | — | — | — | — | — | 100 | — | — | — |
| | Copolymer (5) | 95 | 100 | 100 | 100 | 100 | 100 | 100 | — | — | — | 100 |
| | Natural rubber | — | — | — | — | — | — | — | — | — | — | — |
| | Carbon black | — | 5 | 5 | 5 | 5 | 5 | 5 | 5 | 5 | 5 | 5 |
| | Oil | — | 25 | 25 | 25 | 25 | 25 | 25 | 25 | 25 | 25 | 25 |
| | Silica | — | 75 | 75 | 75 | 75 | 75 | 75 | 75 | 75 | 75 | 75 |
| | Silane coupling agent | — | 6 | 6 | 6 | 6 | 6 | 6 | 6 | 6 | 6 | 6 |
| | Antioxidant | — | 1.5 | 1.5 | 1.5 | 1.5 | 1.5 | 1.5 | 1.5 | 1.5 | 1.5 | 1.5 |
| | Stearic acid | — | 2 | 2 | 2 | 2 | 2 | 2 | 2 | 2 | 2 | 2 |
| | Zinc oxide | — | 2.5 | 2.5 | 2.5 | 2.5 | 2.5 | 2.5 | 2.5 | 2.5 | 2.5 | 2.5 |
| | Wax | — | 1 | 1 | 1 | 1 | 1 | 1 | 1 | 1 | 1 | 1 |
| | Sulfur | — | 2 | 1.5 | 1 | 1 | 1 | 1 | 2 | 2 | 1 | 1 |
| | Sulfur donor (1) | — | 0.1 | 0.2 | 1 | 3 | 5 | 7 | 3 | 3 | 1 | 9 |
| | Sulfur donor (2) | — | — | — | — | — | — | — | — | — | — | — |
| | Sulfur donor (3) | — | — | — | — | — | — | — | — | — | — | — |
| | Sulfur donor (4) | — | — | — | — | — | — | — | — | — | — | — |
| | Vulcanization accelerator (1) | — | 1.8 | 1.8 | 1.8 | 1.8 | 1.8 | 1.8 | 1.8 | 1.8 | 1.8 | 1.8 |
| | Vulcanization accelerator (2) | — | 1.2 | 1.2 | 1.2 | 1.2 | 1.2 | 1.2 | 1.2 | 1.2 | 1.2 | 1.2 |
| Evaluation | Rubber tensile strength index | — | 212 | 216 | 216 | 215 | 210 | 211 | 211 | 195 | 133 | 175 |
| | Abrasion resistance index | — | 138 | 141 | 139 | 137 | 138 | 139 | 136 | 120 | 102 | 111 |
| | Fuel economy index | — | 107 | 111 | 112 | 114 | 114 | 114 | 101 | 99 | 101 | 113 |
| | Cure rate index | — | 69 | 81 | 88 | 100 | 113 | 117 | 97 | 113 | 106 | 130 |

TABLE 4

| | | Degree of hydrogenation (mol %) | Comparative Example 11 | Example 8 | Example 9 | Example 10 | Example 11 | Example 12 | Example 13 | Example 14 | Comparative Example 12 | Comparative Example 13 |
|---|---|---|---|---|---|---|---|---|---|---|---|---|
| Formulation (parts by mass) | Copolymer (1) | 0 | — | — | — | — | — | — | — | — | — | — |
| | Copolymer (2) | 60 | — | — | — | — | — | — | — | — | — | — |
| | Copolymer (3) | 80 | — | — | — | — | — | — | — | 100 | — | — |
| | Copolymer (4) | 95 | — | — | — | — | — | — | 100 | — | — | — |
| | Copolymer (5) | 95 | 100 | 100 | 100 | 100 | 100 | 100 | — | — | — | 100 |
| | Natural rubber | — | — | — | — | — | — | — | — | — | — | — |
| | Carbon black | — | 5 | 5 | 5 | 5 | 5 | 5 | 5 | 5 | 5 | 5 |
| | Oil | — | 25 | 25 | 25 | 25 | 25 | 25 | 25 | 25 | 25 | 25 |
| | Silica | — | 75 | 75 | 75 | 75 | 75 | 75 | 75 | 75 | 75 | 75 |
| | Silane coupling agent | — | 6 | 6 | 6 | 6 | 6 | 6 | 6 | 6 | 6 | 6 |
| | Antioxidant | — | 1.5 | 1.5 | 1.5 | 1.5 | 1.5 | 1.5 | 1.5 | 1.5 | 1.5 | 1.5 |
| | Stearic acid | — | 2 | 2 | 2 | 2 | 2 | 2 | 2 | 2 | 2 | 2 |
| | Zinc oxide | — | 2.5 | 2.5 | 2.5 | 2.5 | 2.5 | 2.5 | 2.5 | 2.5 | 2.5 | 2.5 |
| | Wax | — | 1 | 1 | 1 | 1 | 1 | 1 | 1 | 1 | 1 | 1 |
| | Sulfur | — | 2 | 1.5 | 1 | 1 | 1 | 1 | 2 | 2 | 1 | 1 |
| | Sulfur donor (1) | — | — | — | — | — | — | — | — | — | — | — |
| | Sulfur donor (2) | — | 0.1 | 0.2 | 1 | 3 | 5 | 7 | 3 | 3 | 1 | 9 |
| | Sulfur donor (3) | — | — | — | — | — | — | — | — | — | — | — |
| | Sulfur donor (4) | — | — | — | — | — | — | — | — | — | — | — |
| | Vulcanization accelerator (1) | — | 1.8 | 1.8 | 1.8 | 1.8 | 1.8 | 1.8 | 1.8 | 1.8 | 1.8 | 1.8 |
| | Vulcanization accelerator (2) | — | 1.2 | 1.2 | 1.2 | 1.2 | 1.2 | 1.2 | 1.2 | 1.2 | 1.2 | 1.2 |
| Evaluation | Rubber tensile strength index | — | 212 | 217 | 224 | 222 | 221 | 213 | 213 | 195 | 135 | 186 |
| | Abrasion resistance index | — | 138 | 142 | 139 | 137 | 133 | 134 | 137 | 120 | 103 | 115 |
| | Fuel economy index | — | 107 | 112 | 113 | 116 | 118 | 116 | 102 | 99 | 101 | 116 |
| | Cure rate index | — | 67 | 80 | 85 | 95 | 106 | 113 | 92 | 106 | 103 | 125 |

TABLE 5

| | | Degree of hydrogenation (mol %) | Comparative Example 14 | Example 15 | Example 16 | Example 17 | Example 18 | Example 19 | Example 20 | Example 21 | Comparative Example 15 | Comparative Example 16 |
|---|---|---|---|---|---|---|---|---|---|---|---|---|
| Formulation (parts by mass) | Copolymer (1) | 0 | — | — | — | — | — | — | — | — | — | — |
| | Copolymer (2) | 60 | — | — | — | — | — | — | — | — | 100 | — |
| | Copolymer (3) | 80 | — | — | — | — | — | — | — | 100 | — | — |
| | Copolymer (4) | 95 | — | — | — | — | — | — | 100 | — | — | — |
| | Copolymer (5) | 95 | 100 | 100 | 100 | 100 | 100 | 100 | — | — | — | 100 |
| | Natural rubber | — | — | — | — | — | — | — | — | — | — | — |
| | Carbon black | — | 5 | 5 | 5 | 5 | 5 | 5 | 5 | 5 | 5 | 5 |
| | Oil | — | 25 | 25 | 25 | 25 | 25 | 25 | 25 | 25 | 25 | 25 |
| | Silica | — | 75 | 75 | 75 | 75 | 75 | 75 | 75 | 75 | 75 | 75 |
| | Silane coupling agent | — | 6 | 6 | 6 | 6 | 6 | 6 | 6 | 6 | 6 | 6 |
| | Antioxidant | — | 1.5 | 1.5 | 1.5 | 1.5 | 1.5 | 1.5 | 1.5 | 1.5 | 1.5 | 1.5 |
| | Stearic acid | — | 2 | 2 | 2 | 2 | 2 | 2 | 2 | 2 | 2 | 2 |
| | Zinc oxide | — | 2.5 | 2.5 | 2.5 | 2.5 | 2.5 | 2.5 | 2.5 | 2.5 | 2.5 | 2.5 |
| | Wax | — | 1 | 1 | 1 | 1 | 1 | 1 | 1 | 1 | 1 | 1 |
| | Sulfur | — | 2 | 1.5 | 1 | 1 | 1 | 1 | 2 | 2 | 1 | 1 |
| | Sulfur donor (1) | — | — | — | — | — | — | — | — | — | — | — |
| | Sulfur donor (2) | — | — | — | — | — | — | — | — | — | — | — |
| | Sulfur donor (3) | — | 0.1 | 0.2 | 1 | 3 | 5 | 7 | 3 | 3 | 1 | 9 |
| | Sulfur donor (4) | — | — | — | — | — | — | — | — | — | — | — |
| | Vulcanization accelerator (1) | — | 1.8 | 1.8 | 1.8 | 1.8 | 1.8 | 1.8 | 1.8 | 1.8 | 1.8 | 1.8 |
| | Vulcanization accelerator (2) | — | 1.2 | 1.2 | 1.2 | 1.2 | 1.2 | 1.2 | 1.2 | 1.2 | 1.2 | 1.2 |
| Evaluation | Rubber tensile strength index | — | 213 | 218 | 224 | 228 | 226 | 223 | 210 | 192 | 133 | 191 |
| | Abrasion resistance index | — | 138 | 137 | 138 | 135 | 133 | 134 | 135 | 120 | 102 | 111 |
| | Fuel economy index | — | 106 | 108 | 109 | 114 | 114 | 111 | 101 | 98 | 100 | 118 |
| | Cure rate index | — | 67 | 81 | 85 | 95 | 103 | 113 | 97 | 113 | 106 | 123 |

TABLE 6

| | | Degree of hydrogenation (mol %) | Comparative Example 17 | Example 22 | Example 23 | Example 24 | Example 25 | Example 26 | Example 27 | Example 28 | Comparative Example 18 | Comparative Example 19 |
|---|---|---|---|---|---|---|---|---|---|---|---|---|
| Formulation (parts by mass) | Copolymer (1) | 0 | — | — | — | — | — | — | — | — | — | — |
| | Copolymer (2) | 60 | — | — | — | — | — | — | — | — | 100 | — |
| | Copolymer (3) | 80 | — | — | — | — | — | — | — | 100 | — | — |
| | Copolymer (4) | 95 | — | — | — | — | — | — | 100 | — | — | — |
| | Copolymer (5) | 95 | 100 | 100 | 100 | 100 | 100 | 100 | — | — | — | 100 |
| | Natural rubber | — | — | — | — | — | — | — | — | — | — | — |
| | Carbon black | — | 5 | 5 | 5 | 5 | 5 | 5 | 5 | 5 | 5 | 5 |
| | Oil | — | 25 | 25 | 25 | 25 | 25 | 25 | 25 | 25 | 25 | 25 |
| | Silica | — | 75 | 75 | 75 | 75 | 75 | 75 | 75 | 75 | 75 | 75 |
| | Silane coupling agent | — | 6 | 6 | 6 | 6 | 6 | 6 | 6 | 6 | 6 | 6 |
| | Antioxidant | — | 1.5 | 1.5 | 1.5 | 1.5 | 1.5 | 1.5 | 1.5 | 1.5 | 1.5 | 1.5 |
| | Stearic acid | — | 2 | 2 | 2 | 2 | 2 | 2 | 2 | 2 | 2 | 2 |
| | Zinc oxide | — | 2.5 | 2.5 | 2.5 | 2.5 | 2.5 | 2.5 | 2.5 | 2.5 | 2.5 | 2.5 |
| | Wax | — | 1 | 1 | 1 | 1 | 1 | 1 | 1 | 1 | 1 | 1 |
| | Sulfur | — | 2 | 1.5 | 1 | 1 | 1 | 1 | 2 | 2 | 1 | 1 |
| | Sulfur donor (1) | — | — | — | — | — | — | — | — | — | — | — |
| | Sulfur donor (2) | — | — | — | — | — | — | — | — | — | — | — |
| | Sulfur donor (3) | — | — | — | — | — | — | — | — | — | — | — |
| | Sulfur donor (4) | — | 0.1 | 0.2 | 1 | 3 | 5 | 7 | 3 | 3 | 1 | 9 |
| | Vulcanization accelerator (1) | — | 1.8 | 1.8 | 1.8 | 1.8 | 1.8 | 1.8 | 1.8 | 1.8 | 1.8 | 1.8 |
| | Vulcanization accelerator (2) | — | 1.2 | 1.2 | 1.2 | 1.2 | 1.2 | 1.2 | 1.2 | 1.2 | 1.2 | 1.2 |
| Evaluation | Rubber tensile strength index | — | 209 | 214 | 220 | 223 | 221 | 219 | 209 | 195 | 133 | 187 |
| | Abrasion resistance index | — | 137 | 136 | 136 | 134 | 130 | 131 | 134 | 120 | 100 | 109 |
| | Fuel economy index | — | 106 | 110 | 111 | 114 | 115 | 116 | 101 | 99 | 99 | 116 |
| | Cure rate index | — | 70 | 85 | 100 | 109 | 113 | 119 | 97 | 117 | 109 | 121 |

Tables 2 to 6 show that, in Examples 1 to 28, the fuel economy, rubber tensile strength, and abrasion resistance were well-improved, and further the cure rate was maintained in a favorable range. It is thus demonstrated that the use of a rubber composition that contained a hydrogenated copolymer having a degree of hydrogenation of 75 mol % or more in an amount of 75% by mass or more based on 100% by mass of the rubber component, and further contained 0.2 to 8 parts by mass of a sulfur donor per 100 parts by mass of the rubber component improved fuel economy, rubber tensile strength, and abrasion resistance while maintaining a favorable cure rate.

The invention claimed is:

1. A pneumatic tire, formed from a rubber composition, the rubber composition comprising a hydrogenated copolymer and a sulfur donor which is at least one of a dithiophosphate compound represented by following formula (I):

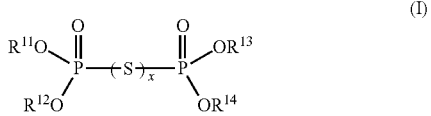

wherein x represents an integer of 1 or more, and $R^{11}$ to $R^{14}$ are the same as or different from one another and each represents a branched or unbranched C1-C18 alkyl group or a C5-C12 cycloalkyl group, or a thiuram vulcanization accelerator represented by following formula (II):

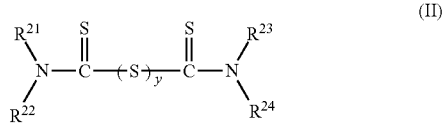

wherein y represents an integer of 1 or more, and $R^{21}$ to $R^{24}$ are the same as or different from one another and each represent a C1-C30 hydrocarbyl group, and $R^{21}$ and $R^{22}$, or $R^{23}$ and $R^{24}$, may be joined together to form a ring, the hydrogenated copolymer containing a structural unit derived from an aromatic vinyl compound and a structural unit derived from a conjugated diene compound and having a degree of hydrogenation of the conjugated diene portion of 75 mol % or more, the hydrogenated copolymer being present in an amount of 75% by mass or more based on 100% by mass of a rubber component in the rubber composition, the sulfur donor being present in an amount of 0.2 to 8 parts by mass per 100 parts by mass of the rubber component.

2. The pneumatic tire according to claim 1, wherein the hydrogenated copolymer has a weight average molecular weight of 200,000 to 2,000,000.

3. The pneumatic tire according to claim 1, wherein the hydrogenated copolymer has a degree of hydrogenation of 90 mol % or more.

4. The pneumatic tire according to claim 1, wherein the hydrogenated copolymer is a hydrogenated styrene-butadiene copolymer.

5. The pneumatic tire according to claim 4, wherein the hydrogenated styrene-butadiene copolymer is a hydrogenated modified styrene-butadiene copolymer.

6. The pneumatic tire according to claim 4, wherein the hydrogenated styrene-butadiene copolymer has a styrene content of 5% to 40% by mass.

7. The pneumatic tire according to claim 4, wherein the hydrogenated styrene-butadiene copolymer is present in an amount of 90% to 100% by mass based on 100% by mass of the rubber component.

8. The pneumatic tire according to claim 1, wherein the rubber composition further comprises, per 100 parts by mass of the rubber component, 1 to 200 parts by mass of silica and 1 part by mass or more of carbon black.

9. A method for producing the rubber composition used to form the pneumatic tire according to claim 1, the method comprising:

a base kneading step of kneading the rubber component including the hydrogenated copolymer to form a first kneadate, and a final kneading step of adding the sulfur donor to the first kneadate obtained in the base kneading step and kneading the sulfur donor and the first kneadate to produce the rubber composition.

10. The pneumatic tire according to claim 2, wherein the hydrogenated copolymer has a degree of hydrogenation of 90 mol % or more.

11. The pneumatic tire according to claim 6, wherein the hydrogenated styrene-butadiene copolymer is present in an amount of 90% to 100% by mass based on 100% by mass of the rubber component.

12. The pneumatic tire according to claim 11, wherein the hydrogenated copolymer has a weight average molecular weight of 200,000 to 2,000,000.

13. The pneumatic tire according to claim 12, wherein the hydrogenated copolymer has a degree of hydrogenation of 90 mol % or more.

* * * * *